No. 889,285. PATENTED JUNE 2, 1908.
P. E. WILLIAMS.
SEED PLANTER.
APPLICATION FILED SEPT. 4, 1907.

2 SHEETS—SHEET 1.

Witnesses
Chas. N. Davies
Myron H. Clear

Inventor
Paul E. Williams
By C. L. Parker
Attorney

No. 889,285. PATENTED JUNE 2, 1908.
P. E. WILLIAMS.
SEED PLANTER.
APPLICATION FILED SEPT. 4, 1907.
2 SHEETS—SHEET 2.
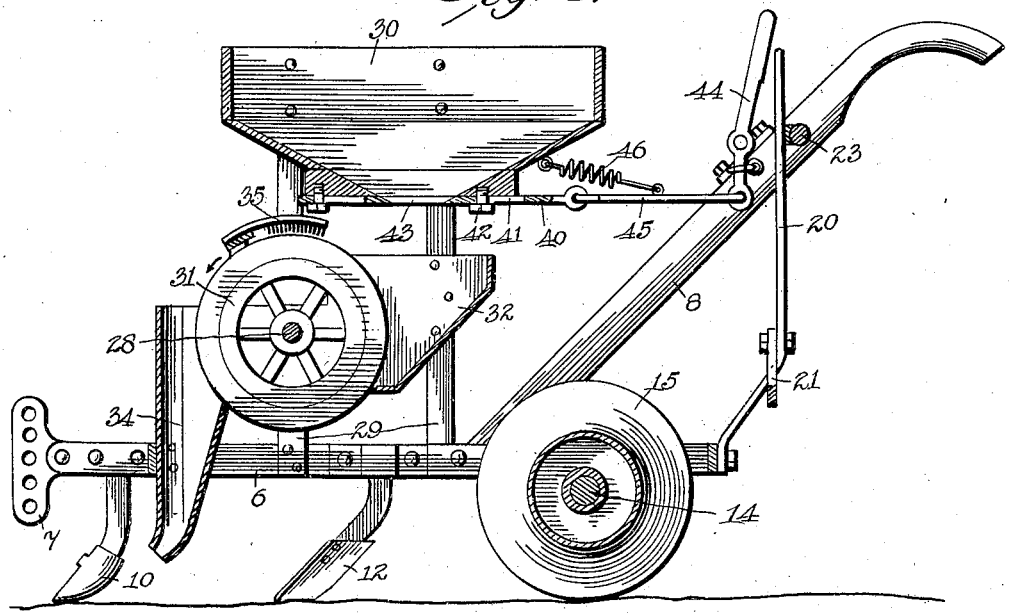
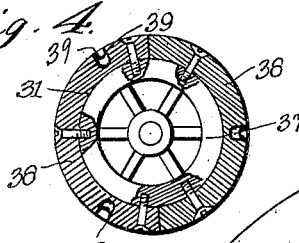
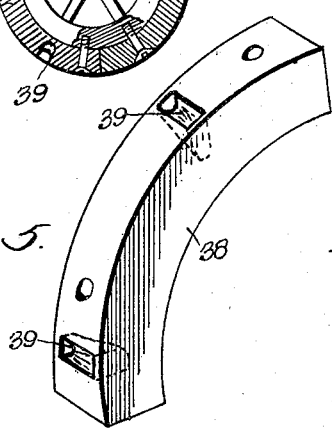
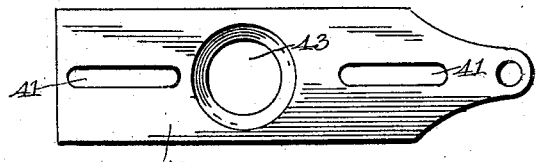
Witnesses
Chas. K. Davies.
Myron H. Clear.
Inventor
Paul E. Williams
By R. L. Parker
Attorney

UNITED STATES PATENT OFFICE.

PAUL EATON WILLIAMS, OF PARIS, TEXAS.

SEED-PLANTER.

No. 889,285.  Specification of Letters Patent.  Patented June 2, 1908.

Application filed September 4, 1907. Serial No. 391,369.

*To all whom it may concern:*

Be it known that I, PAUL E. WILLIAMS, a citizen of the United States, residing at Paris, in the county of Lamar and State of Texas, have invented certain new and useful Improvements in Seed-Planters, of which the following is a specification.

My invention relates to seed planters and has for its object to provide a simply constructed apparatus of this character wherein provision is made for planting seeds of different sizes and shapes, wherein a supplemental hopper is so situated and arranged with relation to the feed disk that all danger of cracking or mashing the seed is entirely eliminated, and wherein novel means for controlling the feed from the main to the supplemental hoppers and for generally bettering the construction and operation of a device of this class is provided.

Figure 1:
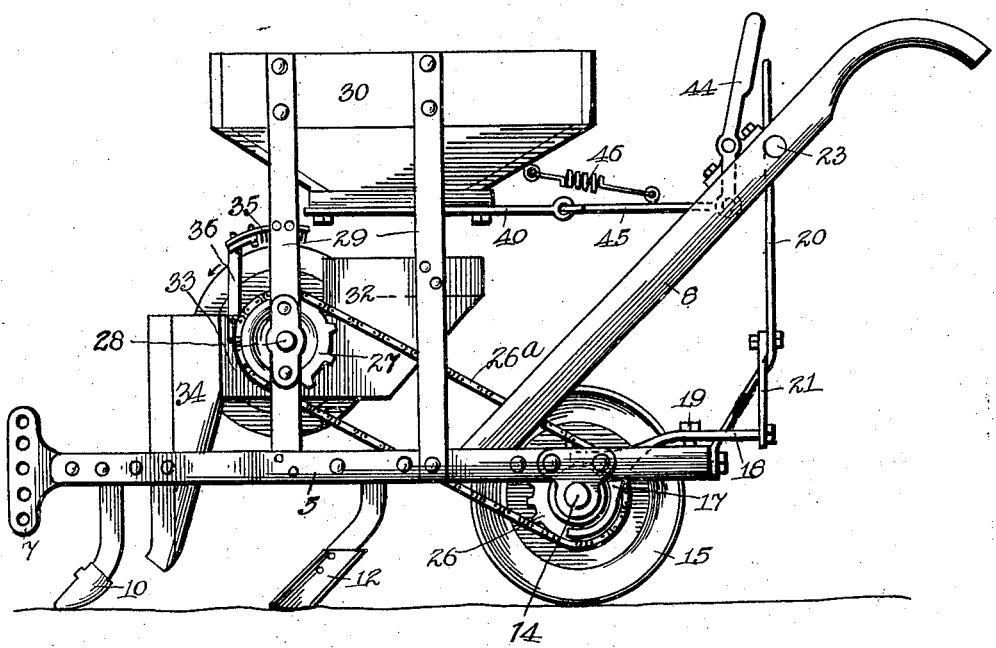
Figure 2:
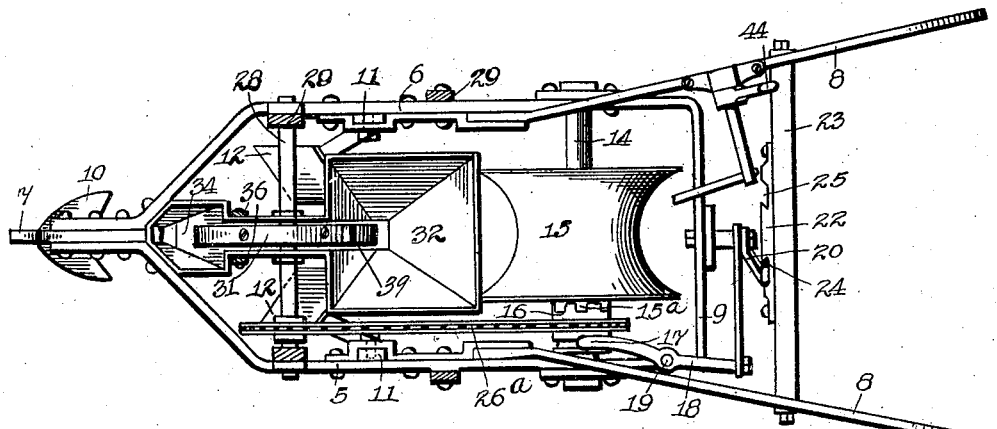

My invention further consists in the features of construction, arrangement, and combination hereinafter described and pointed out in the accompanying drawings in which, Figure 1 is a side elevation of my improved planter, Fig. 2 is a plan view thereof, the main hopper having been removed, Fig. 3 is a sectional side elevation, thereof, Fig. 4 is a side elevation, partly in section, of the feed disk, Fig. 5 is an enlarged perspective view of one of the removable sections of the feed disk rim, and, Fig. 6 is an enlarged view of the feed gate.

Referring to the drawings my improved planter comprises a supporting frame formed by the spaced side members 5 and 6 converging at their forward ends and connected to a draft clevis 7, and provided with the upwardly diverging guiding handles 8 connected adjacent the rear U-shaped ends 9 of said members 5 and 6.

Connected between the clamped forward ends of members 5 and 6 is a ground opening plow member 10 while connected to the side members at 11 are the slantingly disposed opposing closing or covering plows 12. Journaled in brackets 13 depending from the side members 5 and 6 is a transverse shaft 14 carrying thereon a concave roller 15 having a clutch member $15^a$ formed on one face. A loosely mounted sleeve 16 is arranged on shaft 14 and provided with a clutch on its end adapted to coöperate with said clutch member $15^a$ and is provided on its other end with a circumferential recess in which work the arms of a yoke 17 carried on the end of an oscillating member 18 pivoted to the member 5 at 19. An operating handle 20 is mounted on the rear end 9 of the frame and is adapted to operate the member 18 to clutch or unclutch the roller 15, by means of the connecting rod 21 connected thereto and to the end of the member 18. A plate 22 is fastened to the transverse spacing member 23 arranged between guide handles 8, and said plate is provided with a notch 24 in which the handle 20 rests when moved to clutch roller 15, and a notch 25 in which said handle rests when moved to unclutch the same.

The sleeve 16 on shaft 14 carries a sprocket wheel 26 which by means of the sprocket chain $26^a$ drives a similar wheel 27 mounted on the transverse shaft 28 journaled between the forward pair of the uprights 29 extending from the side members 5 and 6 and supporting the main hopper 30 at their upper ends. Shaft 28 carries the feed disk 31 mounted thereon and rotating through the base of the supplemental hopper 32 provided with side pieces 33 housing said feed disk and integrally united with the tubular seed guide 34 into which the disk is adapted to drop the seed on its rotative movement after receiving them from hopper 32.

The supplemental hopper 32 is arranged opening upwardly beneath the main hopper 30 and is contracted in size toward the point of entrance of the feed disk 31. By constructing the supplemental hopper 32 so that the same opens upwardly and by rotating the feed disk in the direction of the arrows, I eliminate any danger of cracking or mashing the seed as might occur if said feed disk were rotated in the opposite direction, thus carrying the seeds close by the edge of the base of said hopper. To this end I arrange a brush 35 above and in contact with the face of the feed disk, on the supporting arms 36 connected to the side pieces 33, and in case more seeds are crowded into the cups than should be they will be brushed back into the hopper 32.

The feed disk, as shown particularly by Figs. 4 and 5 comprises a central hub 37 on which and to which are connected the removable rim sections 38 by means of screws, bolts or other suitable means. The rims 38 are provided with the cups 39 hollowed therefrom and constructed of uniform width but deeper at one end than at the other. These cups as shown are especially applicable to the planting of peanuts but it will be readily seen that I may easily substitute other rims having different shaped seed caps hollowed therefrom in order to plant other seeds.

The supply of seed from the main hopper 30 to the supplemental hopper 32 is regulated by the feed gate 40, provided with alined longitudinally extending openings 41 slidingly arranged about the shank of the bolts 42 in the base of the main hopper 30. The feed gate 40 is also provided with a central opening 43 adapted when said gate is moved rearwardly to register with the delivery mouth of said main hopper. The feed gate 40 is arranged to be operated by the hand lever 44 pivotally mounted on the guide handle 8 and connected at its lower end to the rear end of the feed gate by means of the connecting rod 45.

The device may be constructed of any material but will preferably be of steel and iron with the exception of the feed disk which will be of wood. A coil spring 46 is arranged connected to the hopper 30 and to the connecting rod 45 to draw said feed gate forward and normally cut off the supply of seed.

Having fully described my invention, what I claim is:

In a seed planter, the combination of a suitably supported hopper having a delivery mouth at its lower end, of a supplemental hopper opening upwardly beneath said main hopper, means for regulating the feed from said main hopper to said supplemental hopper, a feed disk mounted adjacent said supplemental hopper to rotate upwardly therethrough, a seed guide mounted on the opposite side of said disk from said supplemental hopper and united thereto by integral side pieces embracing said feed disk, said feed disk having a plurality of laterally disposed seed cups formed in its periphery deeper at one end than at the other, and a brush mounted above said feed disk to contact with its peripheral surface for removing excess seed, substantially as described.

In testimony whereof I affix my signature, in presence of witnesses.

PAUL EATON WILLIAMS.

Witnesses:
Wm. L. Jones,
Lola Mallory,
Luther Rees.